US006823583B2

(12) United States Patent
Cirio

(10) Patent No.: US 6,823,583 B2
(45) Date of Patent: Nov. 30, 2004

(54) APPARATUS FOR CORKING BOTTLES

(75) Inventor: Sergio Cirio, Canelli (IT)

(73) Assignee: Arol S.p.A., Canelli (IT)

( * ) Notice: Subject to any disclaimer, the term of this patent is extended or adjusted under 35 U.S.C. 154(b) by 58 days.

(21) Appl. No.: 10/277,965

(22) Filed: Oct. 23, 2002

(65) Prior Publication Data

US 2003/0097749 A1 May 29, 2003

(30) Foreign Application Priority Data

Nov. 23, 2001 (IT) .................................... TO2001A1095

(51) Int. Cl.[7] .......................... B23P 21/00; B65B 7/28

(52) U.S. Cl. .......................... 29/785; 29/792; 29/801; 29/407.09; 29/407.1; 29/464; 53/264; 53/319; 53/308; 221/263

(58) Field of Search .......................... 29/407.09, 407.1, 29/450, 464, 559, 36, 335, 785, 787, 789, 790, 792, 795, 797, 801, 818, 235, 282; 53/264, 319, 306, 308; 269/21; 221/263, 265, 278; 198/493, 689.1, 480.1, 470.1

(56) References Cited

U.S. PATENT DOCUMENTS 2,340,106 A * 1/1944 Clark, Jr. .................... 53/302
2,853,770 A * 9/1958 Thorn et al. .................. 29/713
3,352,404 A * 11/1967 Di Settembrini ............ 198/456
3,587,820 A * 6/1971 Lachausee ............... 198/480.1
4,277,928 A * 7/1981 Ahlers ........................... 53/67
5,373,933 A * 12/1994 Planke et al. ............ 198/689.1

FOREIGN PATENT DOCUMENTS

EP 941960 A1 * 9/1999 ............ B67B/1/04
EP 1125886 A1 * 8/2001 ............ B67B/1/00
GB 1378108 * 12/1974

* cited by examiner

*Primary Examiner*—David P. Bryant
*Assistant Examiner*—Jermie E. Cozart
(74) *Attorney, Agent, or Firm*—Sughrue Mion, PLLC

(57) ABSTRACT

In an apparatus for corking bottles, the corks are fed in succession within the cavities of a plurality of vice-like devices, which are driven in rotation by a carousel device and which are designed to be radially compressed by the vice-like devices before their insertion into the respective bottles. The cavity of the vice-like device that each time comes to occupy the position for receiving the cork is set in communication with a negative-pressure source, which sucks the cork downwards, causing it to drop into the cavity, and maintains it in the correct vertical position. Preferably, a similar suction device is provided at the outlet end of feed channel for feeding the corks, which brings the corks to a loading station. A transfer wheel with a vertical axis transfers the corks in succession from the loading station to the starting station of the corking apparatus, where the corks are received within the respective vice-like devices.

6 Claims, 3 Drawing Sheets

APPARATUS FOR CORKING BOTTLES

BACKGROUND OF THE INVENTION

The present invention relates to the field of apparatus for closing bottles or similar containers by inserting corks, in particular ones made of natural cork or similar material, into the necks of the bottles.

For some time the applicant has been producing and marketing apparatus of the type referred to above, which comprise:

means for receiving the bottles to be corked and causing them to advance along a pre-determined path;

a plurality of vice-like devices, which are caused to advance synchronously with the bottles for compressing the corks to be inserted in the bottles radially, each vice-like device being associated to a respective bottle, so as to remain stationary above the bottle during advance of the latter;

a plurality of inserting devices, which are caused to advance synchronously with the bottles for the insertion of a cork into each bottle, each inserting device being associated to a respective bottle in such a way as to remain above the bottle during advance of the latter, each inserting device further comprising a presser stem, driven with reciprocating motion synchronously with the advance of the bottles, in such a way that the presser stem reaches a position of bottom dead centre when the bottle reaches an insertion station, in which the cork, which in the meantime has been radially compressed by the respective vice-like device is completely inserted into the neck of the bottle;

in which said long path of advance of the bottles is arranged at a starting station, where each vice-like device assumes an open condition defining a widened cavity for receiving a respective cork to be inserted; and in which means are provided for feeding corks in succession into the widened cavities of the vice-like devices which come to be each time in the aforesaid starting position.

SUMMARY OF THE INVENTION

The purpose of the present invention is to improve the known machine mentioned above, enhancing its productivity and reliability with simple and relatively inexpensive means.

With a view to achieving this purpose, the subject of the present invention is a machine having all the characteristics that have been referred to above, further characterized in that means are provided for setting in communication the bottom of the cavity of the vice-like device, which each time comes to be in the aforesaid starting station, with a negative-pressure source, so as to suck the cork downwards in order to keep it oriented in the correct vertical position inside the aforesaid receiving cavity.

According to a further characteristic of the present invention, the means for feeding the corks in succession to the starting station comprise a conveyor device, which picks the corks up from a loading position and carries them in succession to the aforesaid starting station, and suction means for accelerating the corks in succession inside a feed channel up to the aforesaid loading position.

According to a preferred embodiment of the invention, the aforesaid conveyor device is a wheel bearing a circumferential set of seats for receiving and conveying the corks. Once more, in the case of the aforesaid preferred embodiment, the path along which the bottles advance is a closed-loop path defined by carousel conveying means.

BRIEF DESCRIPTION OF THE DRAWINGS

Further characteristics and advantages of the present invention will emerge from the ensuing description, with reference to the attached drawings, which are provided purely by way of non-limiting example and in which.

DETAILED DESCRIPTION OF THE INVENTION

Figure 1:
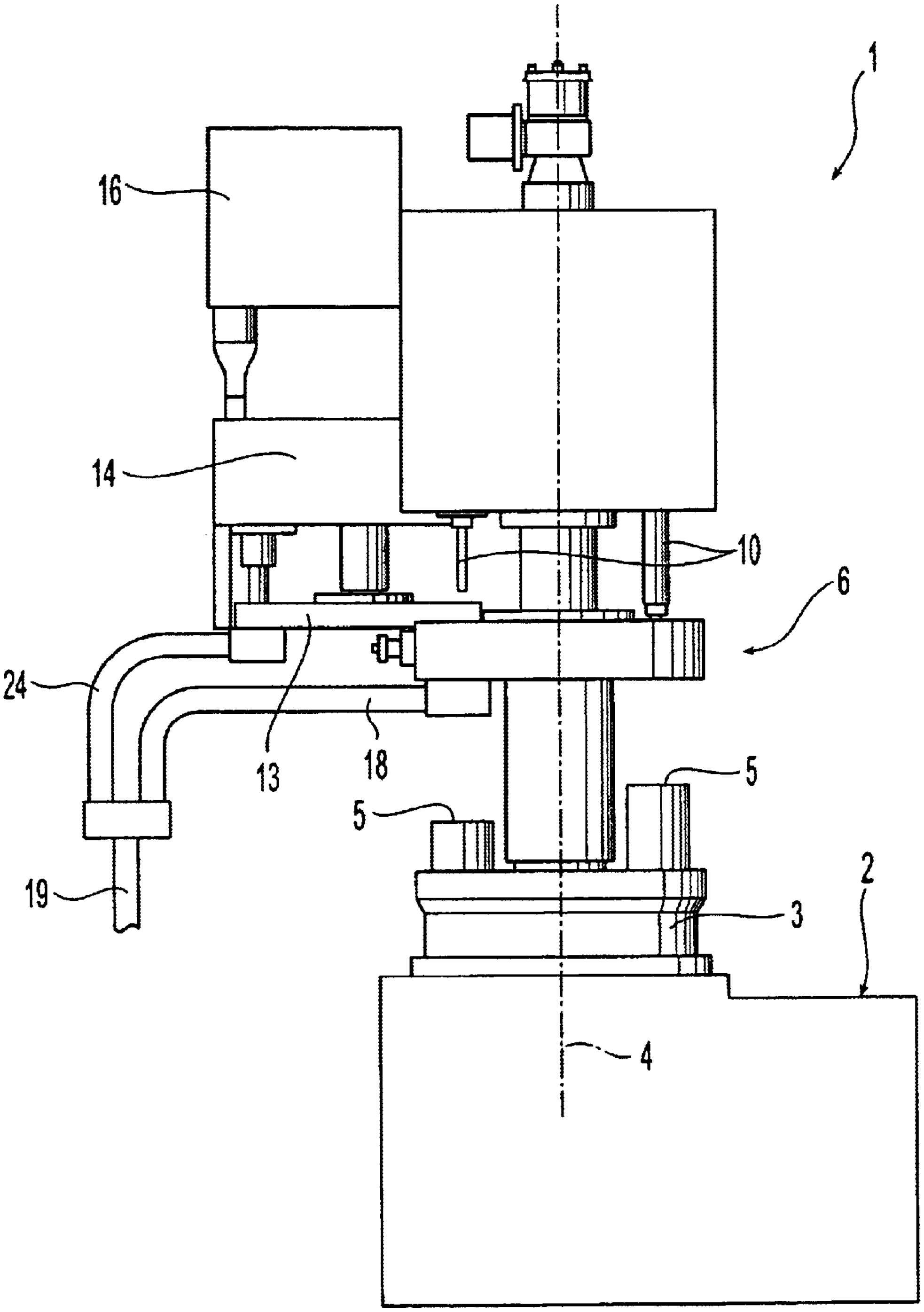
FIG. 1 is a schematic elevation of a preferred embodiment of the apparatus according to the invention.
Figures 2, 4:
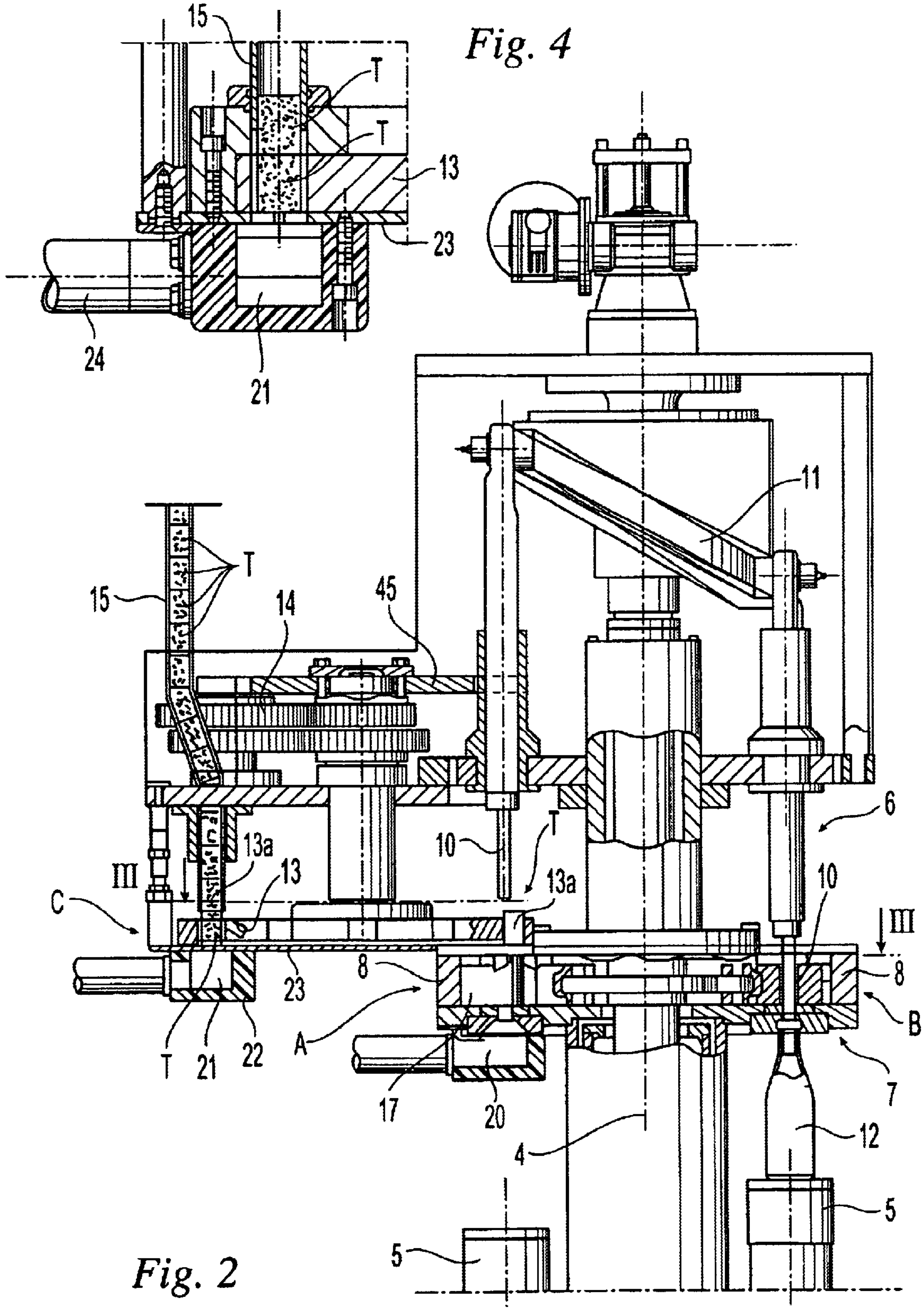
FIG. 2 is a partially sectioned view at an enlarged scale of the apparatus illustrated in FIG. 1.
FIG. 4 is a view at a larger scale of a detail of FIG. 2.
Figure 3:
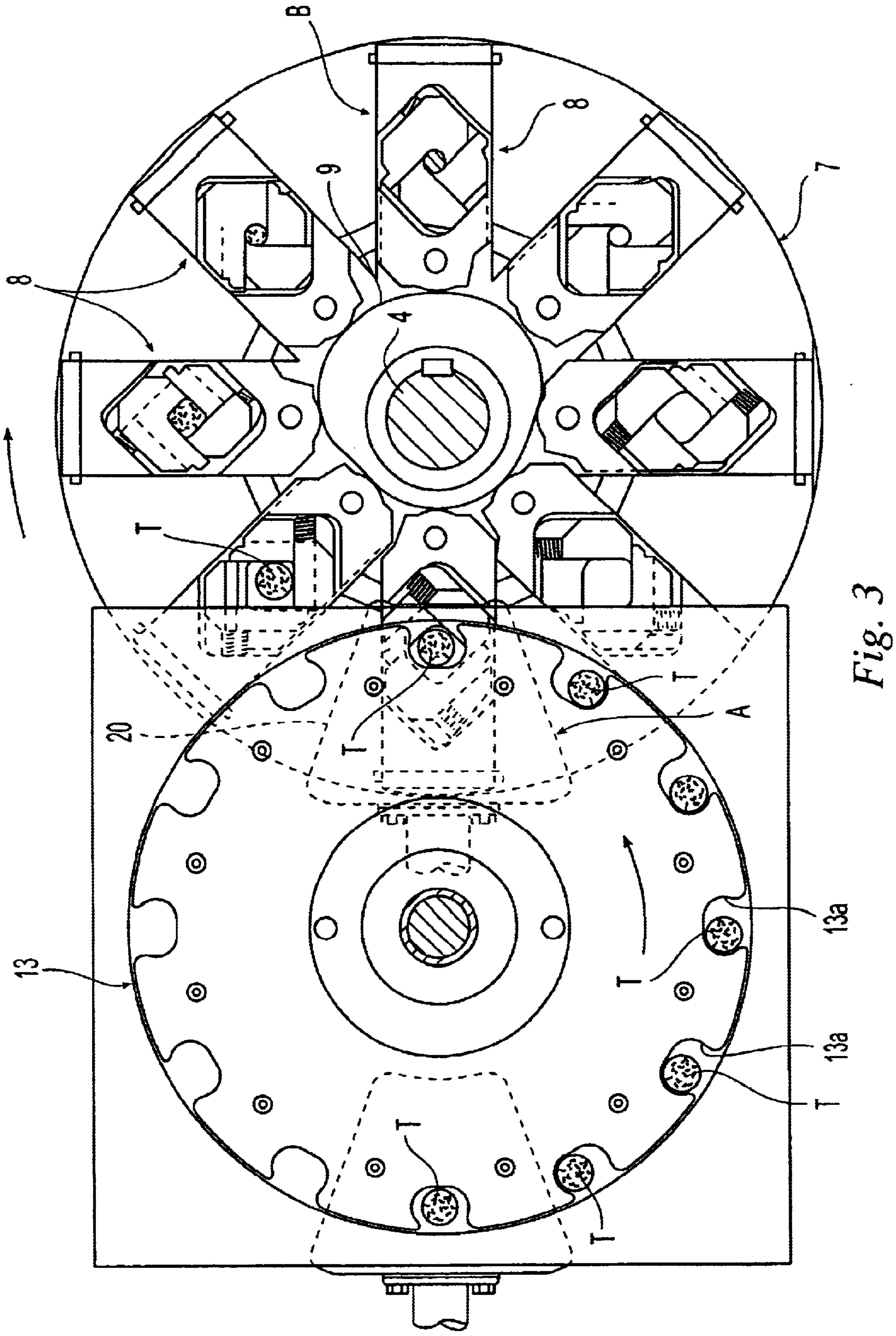
FIG. 3 is a cross-sectional view according to the line III—III of FIG. 2.

In FIG. 1, the reference number 1 designates, as a whole, an apparatus for corking glass bottles, which have previously been filled on a production line, with corks (either natural or synthetic), or the like. The machine 1, in its broad lines, is of a known type manufactured and marketed by the present applicant. The machine 1 comprises a base structure 2, on which there is mounted a rotary platform or turntable 3 that turns about a vertical axis 4 which carries a circumferential set of supports 5, which are vertically mobile and upon which the bottles to be corked (not shown in FIG. 1) rest. Also mounted so that it can turn about the axis 4 is a rotary element 6 for application of the corks to the bottles. This rotary element includes a wheel 7 bearing a circumferential set of vice-like devices 8, which are driven in rotation about the axis 4 and which are progressively displaced, as a result of engagement on central cam 9 (FIG. 3), bringing itself progressively from completely open condition (position A in FIG. 3), in which a cork T can be received in the cavity of the vice-like device, to a closed position (position B in FIG. 3), in which the cork is radially compressed to enable its insertion inside a respective bottle. The rotary element 6 also comprises a circumferential set of inserting stems associated to the various bottles, the said stems being moved vertically as a result of the engagement on a stationary helical cam 11 of the top ends for the stems 10. In the course of rotation about the axis 4, each stem is thus displaceable between a top position and a bottom position, the latter being reached at the position B to cause insertion of the cork, which is compressed by a respective vice-like device 8 into the bottle (designated by 12 in FIG. 2) that comes to be underneath it.

The structure and conformation of the devices described above are, as has already been mentioned, of a type in themselves known. The said structure is consequently not described in further detail herein.

The corks T reach the starting position A of the rotating element 6 in succession, in so far as they are conveyed within respective peripheral seats of a wheel 13, which is driven in rotation, by means of a gear train 14, by a multi-lobed wheel 45 which derives its motion from the successive engagement thereon of the various inserting devices 10 that rotate with the element 6 about the axis 4. The corks T reach the wheel 13 at a loading position C as they drop through a feed channel 15 coming from a storage tank, in which the corks T are accumulated.

According to the present invention, the cavity, designated by 17 (see FIGS. 2 and 3 ), or each vice-like device 8, at the moment in which said device reaches the position A for receiving the cork T, is set in communication, by means of pipes 18, 19 (FIG. 1) with a negative-pressure source (not illustrated), which sucks air from said cavity. The connection is made by engagement of stationary chamber 20, indicated by a dashed line in FIG. 3, as well as by a solid line in FIG. 2, which engages, in a sealed way, the bottom wall of the wheel 7 in a position corresponding to the aforesaid position A for receiving the corks T. The chamber 20 communicates with the chamber 17 via a passage in the bottom wall of the wheel 7. As may be seen in FIG. 3, the profile of the chamber 20, in plan view, is made up of sectors of a circle, with centre on the axis 4, in such a way that communication of the chamber 17 with the negative-pressure is maintained for a certain angle of rotation of the wheel 7 about the position A.

Thanks to the aforesaid solution, the cork T, which each time drops into the receiving chamber 17, located in position A, from the transfer wheel 13 bearing the peripheral seats 13*a* for conveying the corks (see FIG. 3), is accelerated and kept in the correct vertical position inside the chamber 17 until, with the further rotation of the wheel 7, it is gripped by the elements of the respective vice-like device 8.

As already mentioned above, the corks T are brought into the starting position A of the rotating element 6, 7 by the transfer wheel 13, which picks up the corks T from the loading position C. Feeding of the corks T to the position C is accelerated by the application of negative pressure also on a chamber 21 (see FIGS. 2 and 4 ) made in a stationary body 22 mounted underneath a horizontal plate 23, which acts as resting base for the corks T, whilst the latter are drawn along by the transfer wheel 13. The chamber 21 communicates with the same negative-pressure source already mentioned previously by means of the pipe 19, and a further pipe 24 (FIG. 1), which, together with the pipe 18, converges into the pipe 19 referred to above. Application of negative pressure on the loading station C, where the transfer wheel 13 receives the corks T that arrive in succession in the feed channel 15, enables a considerable increase in the speed with which the corks themselves drop.

As already mentioned above, the idea underlying the invention is to provide means for applying negative pressure on the position A in order to maintain each cork in a correct position in the receiving chamber of the respective vice-like device, until the latter is tightened as well as, preferably, to provide, in addition, application of negative pressure at the outlet ends of the feed channel 15, a transfer wheel 13 being provided for transferring the accelerated corks T to the outlet of the channel up from the position A, where they are received, in succession inside the various vice-like devices 8. As to the rest, the structure of the corking machine can be built both in the manner illustrated, by way of example, in the attached drawings, with reference to a specific type of machine that has already been manufactured and marketed by the present applicant, as well as to any other type of machine.

Of course, without prejudice to the principle of the invention, the details of construction and the embodiments may vary widely with respect to what is described and illustrated herein purely by way of example, without thereby departing from the scope of the present invention.

What is claimed is:

1. An apparatus for closing bottles or similar containers by insertion of corks, in particular ones made of natural cork, into the necks of the bottles, comprising:

means for receiving the bottles to be corked and causing them to advance along a pre-determined path;

a plurality of vice, devices, which are caused to advance synchronously with the bottles for compressing the corks to be inserted in the bottles radially, each vice device being associated with a respective bottle, so as to remain stationary above the bottle during advance of the bottle;

a plurality of inserting devices, which advance synchronously with the bottles for the insertion of cork into each bottle, each inserting device being associated with a respective bottle in such a way as to remain above the bottle during advance of the bottle, each inserting device further comprising a presser stem, driven with reciprocating motion synchronously with the advance of the bottles, in such a way that the presser stem reaches a bottom position when the bottle reaches an insertion station, in which the cork, which in the meantime has been radially compressed by the respective vice device is completely inserted into the neck of the bottle;

in which, said path of advance of the bottles is arranged at a starting position, where each vice device assumes an open condition defining a widened cavity for receiving a respective cork to be inserted; and in which feeding means are provided for feeding corks in succession into the widened cavities of the vice devices which arrive at said starting position;

wherein connecting means are provided for connecting the bottom of the cavity of the vice device, which each time arrives at the starting position, with a negative-pressure source, so as to suck a respective cork downwards in order to keep the cork oriented in the correct vertical position.

2. The apparatus according to claim 1, characterized in that the means for feeding the corks in succession to the starting position comprises a conveyor device, which picks the corks up from a loading position and carries them in succession to the starting position, and suction means for accelerating the corks in succession inside a feed channel up to the aforesaid loading position.

3. The apparatus according to claim 2, wherein the aforesaid conveyor device consists of a transfer wheel having a circumferential set of seats for receiving and conveying the corks from the loading position to the starting position.

4. The apparatus according to claim 3, wherein the path along which the bottles, the vice devices and the inserting devices advance is a closed-loop path defined by carousel conveying means.

5. The apparatus according to claim 4, wherein said connecting means for connecting the bottom of the cavity of the vice device with the negative-pressure source comprise a chamber defined within a stationary body which enters into contact, in a sealed way, with the bottom wall of a wheel bearing a circumferential set of the aforesaid vice devices so as to establish a communication between the negative-pressure source and the cavity of the vice device which each time, comes to be in the starting position.

6. The apparatus according to claim 5, wherein the aforesaid transfer wheel has a vertical axis and is mounted immediately above a horizontal plate, which acts as a resting base for the corks, while the corks are drawn along by the transfer wheel, said suction means associated with the feed channel comprising a cavity defined by a stationary body, which is in contact with the bottom surface of the aforesaid plate, said chamber being in communication through an opening in said plate with circumferential seat of the transfer wheel, which is in the loading position, and, through the seat, with the outlet end of the feed channel.

* * * * *